United States Patent [19]
Maloney

[11] 3,814,026
[45] June 4, 1974

[54] STABILIZING APPARATUS FOR LIFT TRUCKS

[75] Inventor: Joseph H. Maloney, Olympia Fields, Ill.

[73] Assignee: Allis-Chalmers Corporation, Milwaukee, Wis.

[22] Filed: Feb. 2, 1973

[21] Appl. No.: 329,127

[52] U.S. Cl............... 104/246, 104/120, 180/79, 214/16.4 A
[51] Int. Cl............................................. B61f 9/00
[58] Field of Search.............. 214/16.4 A, 16.4 B; 180/79; 104/120, 137, 242, 243, 245, 246

[56] References Cited
UNITED STATES PATENTS

| 734,061 | 7/1903 | Hansler | 104/246 |
| 1,087,773 | 2/1914 | Johnson | 104/246 |
| 1,324,893 | 12/1919 | Hammond | 104/246 |
| 3,143,081 | 8/1964 | Dolphin et al. | 104/246 |
| 3,672,305 | 6/1972 | Richins | 104/23 FS |

FOREIGN PATENTS OR APPLICATIONS

| 257,298 | 9/1964 | Australia | 214/16.4 A |
| 1,455,201 | 3/1969 | Germany | 214/16.4 A |
| 1,142,135 | 1/1963 | Germany | 214/16.4 A |
| 322,211 | 11/1929 | Great Britain | 104/242 |
| 985,350 | 3/1965 | Great Britain | 214/16.4 A |

Primary Examiner—Robert G. Sheridan
Assistant Examiner—R. B. Johnson
Attorney, Agent, or Firm—Charles L. Schwab

[57] ABSTRACT

A lift truck is equipped with front and rear stabilizing rollers on its underside which cooperate with a guide rail disposed centrally in a narrow aisle of a storage facility. The rollers and guide rail cooperate to provide lateral and longitudinal stability for the lift truck thereby permitting stacking and retrieving of rated capacity loads at greater heights. In one embodiment the rear stabilizing rollers are mounted on a trolley which is connected to the truck steering mechanism whereby the steering of the truck is automatically corrected to maintain proper truck alignment on the stabilizing guide rail.

6 Claims, 4 Drawing Figures

PATENTED JUN 4 1974　　　　　　　　　　　　　　　3,814,026
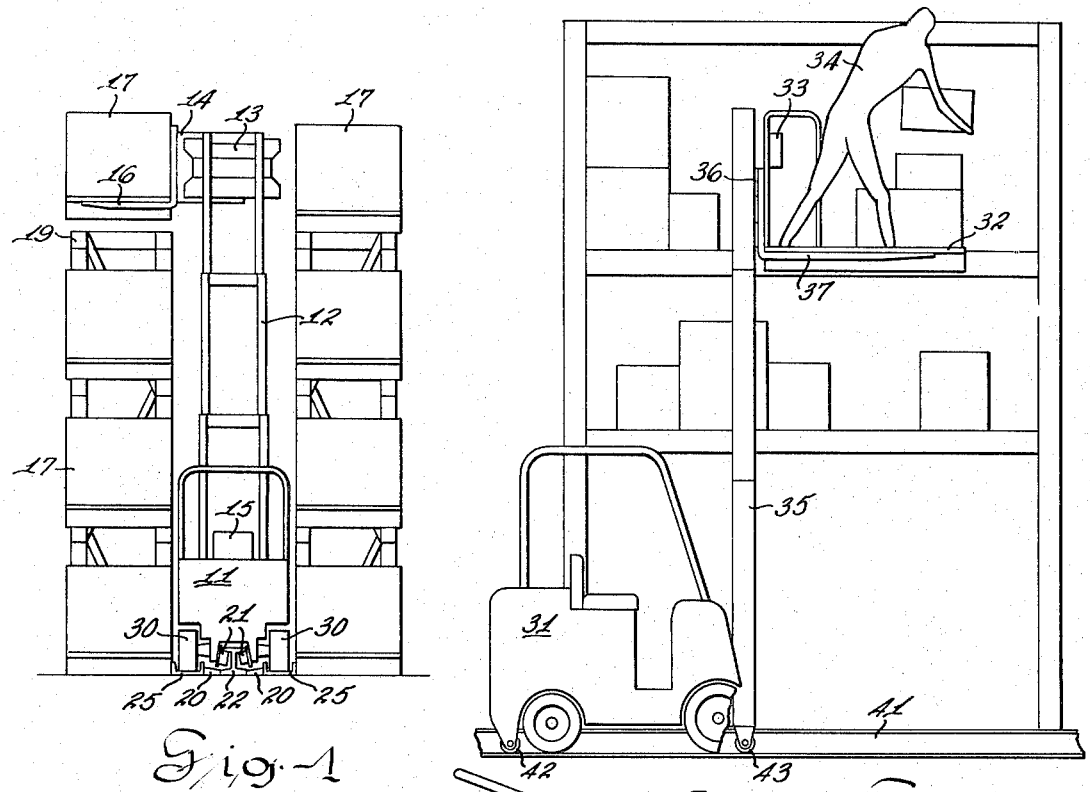
Fig. 1
Fig. 2
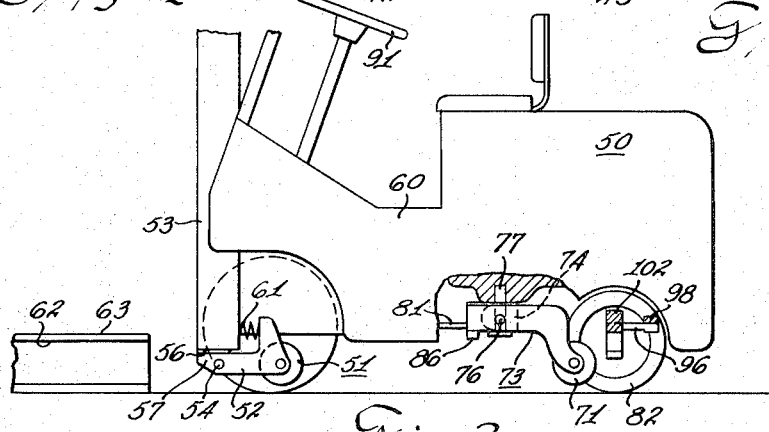
Fig. 3
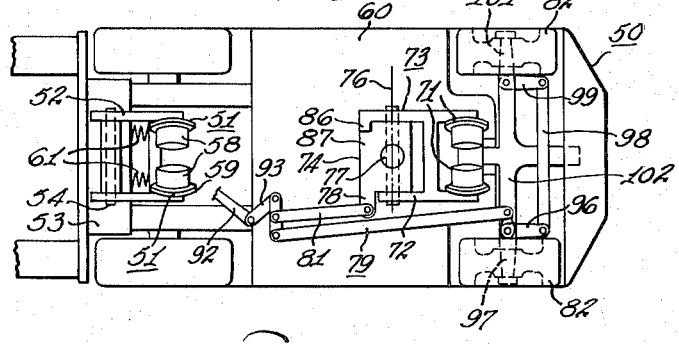
Fig. 4

3,814,026

STABILIZING APPARATUS FOR LIFT TRUCKS

BACKGROUND OF THE INVENTION

The economics of material storage has lead manufacturers and merchandisers to store materials more densely and at elevated heights. The desired warehouse arrangement for this type storage allows narrow aisles for the lift truck and when using an order picker type unit, wherein the operator rides on the lift truck carriage equipped with lift and travel controls, it becomes difficult to guide the lift truck in the aisle when proceeding from one point to another in the warehouse while picking up the orders. Also the lateral stability of the lift truck, when equipped with a sideloader attachment, has become somewhat of a problem due to the elevated height at which goods are stacked in modern warehouses.

BRIEF DESCRIPTION OF THE INVENTION

A truck incorporating the present invention can operate at extended heights in a narrow aisle warehouse without reducing the load rating. A rail is anchored to the floor, or the rack structure, in the aisle between stacks and guide rollers on the lower side of the lift truck engage the rail to provide lateral and longitudinal stability for the truck as well as steering guidance for the truck which may be only a few inches narrower than the aisle. In one version of the invention, the rollers are mounted on pivoting trolleys which allow the rollers to swing upwardly when floor obstructions are encountered during travel of the lift truck from one place to another. In such version, the rear trolley is connected to the steering linkage whereby the truck steering is automatically corrected to align the truck with the rail.

BRIEF DESCRIPTION OF THE DRAWINGS

Several embodiments of the present invention are illustrated in the drawings in which:

FIG. 1 is a view of a counterbalanced lift truck operating in a narrow aisle with a sideloading attachment;

FIG. 2 is a side view of a counterbalanced order picker lift truck;

FIG. 3 is a side view of a lift truck with certain parts broken away for purposes of illustration; and FIG. 4 is a bottom view of the lift truck illustrated in FIG. 3.

DETAILED DESCRIPTION OF THE INVENTION

Referring to FIG. 1, a counterbalanced lift truck 11 is equipped with a multiple section telescoping mast 12 on which a carriage 13 reciprocates vertically. The carriage 13 is equipped with a side-loading attachment 14 which is adjustable through controls, not shown, at the operators station 15 to deposit or retrieve palletized containers 17 at either side of the aisle in which the lift truck is operating. As illustrated, the side-loading attachment 14 is adjusted to extend its load carrying forks 16 to the left side of the lift truck. The container 17 is in position for deposit on a rack 19. After deposit the forks 16 are withdrawn from beneath the load 17 to a position within the aisle between the stacked containers. In FIG. 1, the lift truck 11 is viewed from the rear and it will be noted that the truck is straddling a guide rail 22 which is cooperatively engaged by a pair of guide rollers 21 rotatably mounted on the lower rear of the truck 11. The guide rail 22 is an I-beam fixedly secured to the rack 19 through braces 20 and a pair of channels 25 in which the wheels 30 of the truck 11 are disposed. The guide rail 22 could, if desired, be anchored to the floor. The guide rail 22 and the rollers 21 stabilize the lift truck 11 against lateral tilting and also against forward tilting, thus permitting the truck to deposit and retrieve full rated capacity loads at extended heights. The guide rail 22 not only serves to prevent tilting of the truck but also forces the truck to follow a predetermined path in the aisle thereby preventing damage to merchandise or materials stored at either side of the aisle, that otherwise might occur due to operator steering errors. The rollers 21 have radial flanges which cooperatively engage the lateral edges of the top flange of th I-beam 22 to control the lateral position of the lift truck as it moves along the I-beam. It should be understood that a similar set of rollers are mounted on the lower front of the lift truck 11, such as is shown in the lift truck illustrated in FIG. 2.

Referring to FIG. 2, a lift truck 31 is equipped with an order picker attachment 32 on which lift and drive controls 33 are placed for the convenience of the order picking operator 34. The attachment 32 is releasably secured to the forks 37 on the lift carriage 36 which in turn reciprocates vertically in a nontilting mast 35. In this type lift truck the operator 34 reaches to either side of the aisle to pick cargo from the shelves and load it onto the platform of the attachment 32. The truck is moved from one order picking position to another in the warehouse by operation of the controls 33. An I-beam guide rail 41 and cooperating stabilizing rollers 42, 43 insure truck stability and alignment in the aisle. The order picker truck is stabilized against lateral and forward-tilting movement and also will be guided in the aisles of the warehouse thereby minimizing the danger of accidental bumping of the rack or stored materials. Since the operator can rely on the guide rail and rollers to stabilize and guide the truck he can operate the truck at relatively high travel and lift-lower speeds between order picking stops. In other words, the operator will be able to quickly and accurately move the truck from one order picking position to another while adjusting the height of the mast to the proper height for the next merchandise retrieval.

Referring to FIGS. 3 and 4, a lift truck 50 has a mast 53, the lower section of which is fixedly secured to the frame 60 of the truck. The truck may be equipped with either side loader or order picker attachments. A pair of laterally spaced rollers 51 are pivotally mounted on a trolley or support 52 which in turn is pivotally connected to the lower end of the lift truck mast 53 on a transverse pivot axis 54. A bottom surface 56 of the mast 53 and an end projection 57 of the support 52 form a pair of abutments which cooperatively engage to limit downward swinging movement of the support 52 and rollers 51 about the transverse axis 54. Thus the rollers cooperating with the guide rail structure prevent lateral tilting of the lift truck 50. A pair of coil springs 61 may be used to urge the support 52 to pivot downwardly thus bringing the abutments 56, 57 into engagement. The springs 61 properly position the rollers 51 for engagement with the guide rail 63 and allow upward swinging movement of the support 52 and rollers 51, should floor obstructions be encountered when operating off the guide rail. Each roller 51 has a cylindrical rolling surface 58 and a radial flange 59. The rolling surfaces 58 engage a downward-facing surface 62 on the top flange of a floor mounted guide rail in the form of an I-beam 63.

A second pair of rollers 71 positioned at the lower rear of the lift truck 50 near the longitudinal central vertical plane of the vehicle are in general longitudinal alignment with the front rollers 51. The rollers 71 are of the same design as roller 51 and are rotatably mounted on a first part 72 of a trolley 73. The trolley 73 also includes a second part 74 to which the first part 72 is pivotally connected on a transverse axis 76. The second part 74 is pivotally connected to the truck frame 60 by a vertical pivot pin 77 and includes a laterally extending arm 78 which is pivotally connected to the drag link 79 of the truck steering mechanism by a link 81. This connection with the steering mechanism will cause the steered wheels 82 of the truck to be steered to properly position the truck in response to any horizontal swinging movement of the trolley 73. The steering mechanism includes a manually operated steering wheel 91, a link 92, a lever 93, a drag link 79, a bellcrank portion 96 of wheel axle 97, a cross link 98 and an arm 99 of wheel axle 101; and in a truck with hydraulic power steering, the steering mechanism would include an appropriate hydraulic jack and control valve. The wheel axles 97, 101 are pivotally connected on vertical axes to an oscillating axle 102. The vertically swingable part 72 will swing upwardly if the rollers 72 should happen to pass over an obstruction on the floor traversed by the truck. Downward swinging of the rollers 71 and the part 72 is limited by a fingerlike abutment 86 which, as illustrated, is in engagement with a downward facing abutment in the form of the underside surface 87 of part 74.

From the foregoing description and the drawings it is apparent that a novel material handling system for warehousing has been provided. The stabilizing rollers and guide rail permit the lift truck to stack loads at extended heights without reduction in load rating. The lift truck can be operated in aisles only a few inches wider than the load.

An order picker lift truck incorporating this invention can be operated at high levels with improved safety and efficiency. A material handling system using this invention will reduce the time of loading from drive in and through racks, wherein forward travel at elevated storage levels is required.

The embodiments of the invention in which an exclusive property or privilege is claimed are defined as follows:

1. Stabilizing apparatus for a lift truck of the type having a frame, a lift mast assembly, a steering mechanism, laterally spaced support wheels, said apparatus comprising:
   a fixed I-shaped horizontal guide rail structure, a first pair of laterally spaced rollers rotatably mounted on the central front underside of said mast assembly of said lift truck and adapted to engage a pair of downwardly facing surfaces of said fixed horizontal guide rail structure,
   a second pair of laterally spaced rollers rotatably mounted at the lower central rear frame of said lift truck and adapted to engage said pair of downwardly facing surfaces of said guide rail structure a fixed laterally spaced horizontal channel means located parallel to said guide rail structure and operative to receive said spaced support wheels when said pairs of said spaced rollers are engaged with said guide rail structure, and means rigidly connecting said channel means with said guide rail structure.

2. The stabilizing apparatus of claim 1 wherein said first pair of rollers are rotatably mounted on a support pivotally mounted on said mast assembly on a transverse pivot axis and wherein engagable abutments are formed on said support and truck limiting downward swinging of said support and first pair of rollers whereby said truck is stabilized against lateral tilting and said rollers and support may swing upwardly to clear obstructions.

3. The stabilizing apparatus of claim 2 wherein said second pair of rollers are pivotally mounted on a vertically swinging first part of a trolley and a second part of said trolley is pivotally mounted on said truck frame on a vertical pivot axis, said first part being pivotally connected to said second part on a transverse pivot axis.

4. The stabilizing apparatus of claim 3 wherein said first and second parts have engagable abutments limiting downward swinging movement of said first part and second pair of rollers relative to said second part whereby said truck is stabilized against forward and lateral tilting.

5. The stabilizing apparatus of claim 4 wherein said second part of said trolley is connected to said steering mechanism of said truck whereby pivoting of said trolley about said vertical axis causes steering adjustment of said steering mechanism.

6. The stabilizing apparatus of claim 1 wherein said rollers have radial flanges adapted to engage said guide rail structure.

* * * * *